(12) United States Patent
Asano et al.

(10) Patent No.: US 9,000,547 B2
(45) Date of Patent: Apr. 7, 2015

(54) STRAIN SENSOR AND METHOD FOR MANUFACTURING THE SAME

(71) Applicant: Kabushiki Kaisha Toshiba, Minato-ku (JP)

(72) Inventors: Yusaku Asano, Kanagawa-ken (JP); Kazuhito Higuchi, Kanagawa-ken (JP); Takeshi Miyagi, Kanagawa-ken (JP); Yoshihiro Higashi, Ishikawa-ken (JP); Michiko Hara, Kanagawa-ken (JP); Hideaki Fukuzawa, Kanagawa-ken (JP); Masayuki Kii, Kanagawa-ken (JP); Eizo Fujisawa, Kanagawa-ken (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/203,868

(22) Filed: Mar. 11, 2014

(65) Prior Publication Data

US 2015/0069540 A1    Mar. 12, 2015

(30) Foreign Application Priority Data

Sep. 9, 2013    (JP) .................................. 2013-186705

(51) Int. Cl.
*H01L 29/82*    (2006.01)
*H01L 21/00*    (2006.01)
*G01L 1/12*    (2006.01)
*H01L 29/84*    (2006.01)
*H01L 43/12*    (2006.01)
*H01L 43/08*    (2006.01)

(52) U.S. Cl.
CPC ................. *G01L 1/125* (2013.01); *H01L 29/84* (2013.01); *H01L 43/12* (2013.01); *H01L 43/08* (2013.01)

(58) Field of Classification Search
CPC ........... G01L 1/25; H01L 29/84; H01L 43/12; H01L 43/08
USPC .............................................. 257/421; 438/48
See application file for complete search history.

(56) References Cited

U.S. PATENT DOCUMENTS

| 6,781,231 | B2 | 8/2004 | Minervini |
| 7,078,243 | B2 * | 7/2006 | Spielberger et al. ............. 438/3 |
| 7,723,128 | B2 * | 5/2010 | Wang et al. ....................... 438/3 |
| 2012/0079887 | A1 * | 4/2012 | Giddings et al. ................ 73/779 |

* cited by examiner

*Primary Examiner* — William D Coleman
(74) *Attorney, Agent, or Firm* — Oblon, McClelland, Maier & Neustadt, L.L.P.

(57) ABSTRACT

According to one embodiment, a strain sensor includes a substrate, a lid, a frame, and a sensing unit. The substrate has a first surface. The lid is provided on the first surface. The frame is provided between the substrate and the lid. The frame is nonconductive and includes a magnetic body. The sensing unit is provided inside the frame between the substrate and the lid, and includes a magnetoresistance effect element.

20 Claims, 11 Drawing Sheets

STRAIN SENSOR AND METHOD FOR MANUFACTURING THE SAME

CROSS-REFERENCE TO RELATED APPLICATIONS

This application is based upon and claims the benefit of priority from Japanese Patent Application No. 2013-186705, filed on Sep. 9, 2013; the entire contents of which are incorporated herein by reference.

FIELD

Embodiments described herein relate generally to a strain sensor and a method for manufacturing the same.

BACKGROUND

The component packaging density on interconnect substrates is increasing for electronic devices such as information devices, communication devices, etc., as emphasis is placed on compactness and flexibility. Therefore, the prevention of electromagnetic interference (EMI) between the electronic components in electronic devices is becoming an important issue. There are cases where a strain sensor using a magnetoresistance effect element is mounted in the electronic device. The existence of an external magnetic field easily affects the characteristics of the magnetoresistance effect element of such a strain sensor. As an electromagnetic field countermeasure for the strain sensor, methods are used in which a metal case is provided around the component surface, shielding is provided to cover the component surface with a conductor such as conductive plating, etc. It is desirable to provide a strain sensor having excellent magnetic shield characteristics with high productivity.

BRIEF DESCRIPTION OF THE DRAWINGS

FIG. 5A to FIG. 7B are schematic cross-sectional views illustrating the method for manufacturing the strain sensor;

FIG. 9A to FIG. 10B are schematic cross-sectional views illustrating the method for manufacturing the strain sensor.

DETAILED DESCRIPTION

According to one embodiment, a strain sensor includes a substrate, a lid, a frame, and a sensing unit. The substrate has a first surface. The lid is provided on the first surface. The frame is provided between the substrate and the lid. The frame is nonconductive and includes a magnetic body. The sensing unit is provided inside the frame between the substrate and the lid, and includes a magnetoresistance effect element.

Various embodiments will be described hereinafter with reference to the accompanying drawings. In the description hereinbelow, similar members are marked with like reference numerals, and a description is omitted as appropriate for members once described.

First Embodiment

Figure 1A:
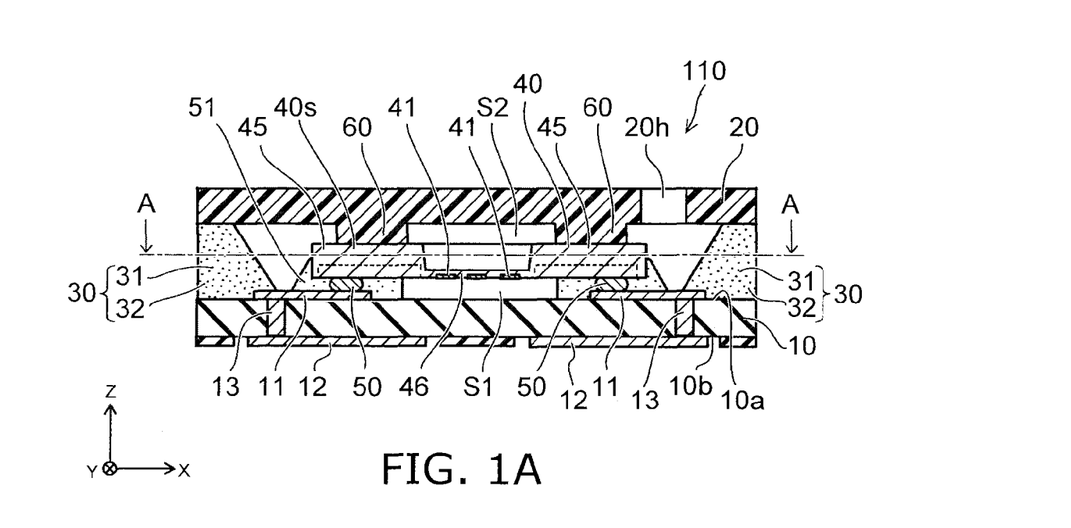
FIGS. 1A and 1B are schematic views illustrating the configuration of a strain sensor according to a first embodiment.
Figure 1B:
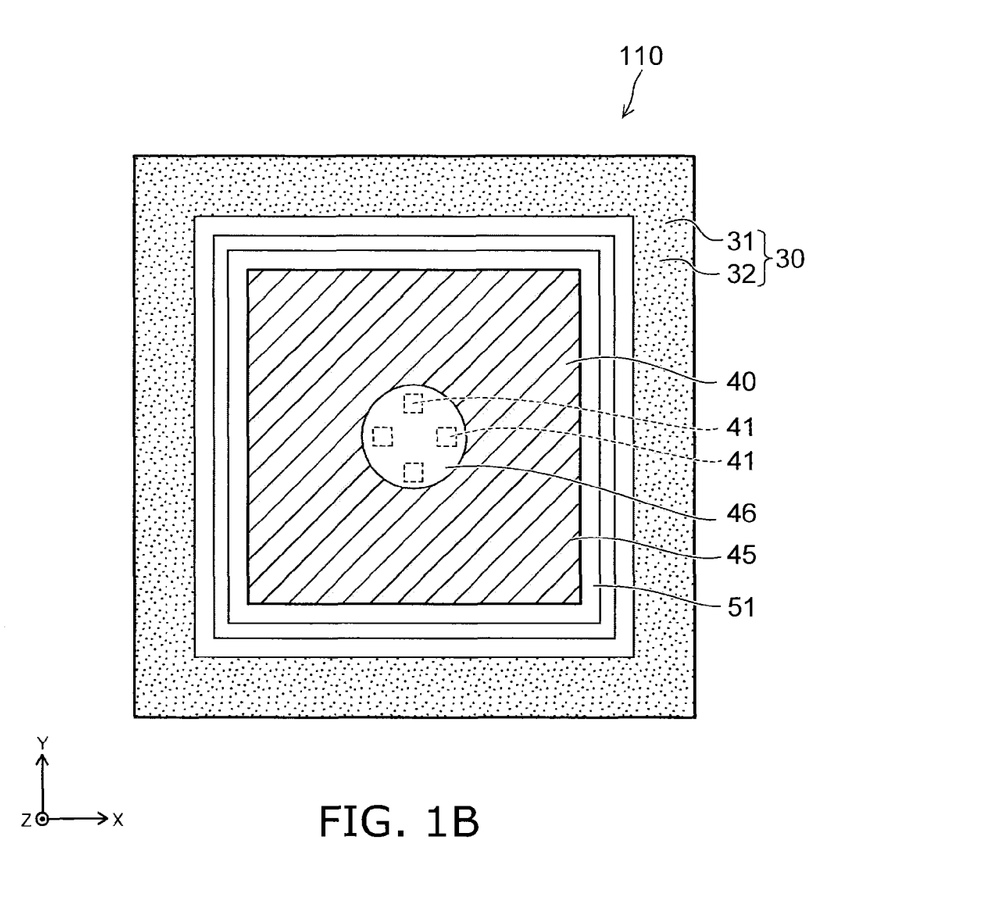

FIGS. 1A and 1B are schematic views illustrating the configuration of a strain sensor according to a first embodiment.

FIG. 1A is a schematic cross-sectional view of the strain sensor 110. FIG. 1B is a schematic plan view along line A-A shown in FIG. 1A.

Figure 2A:
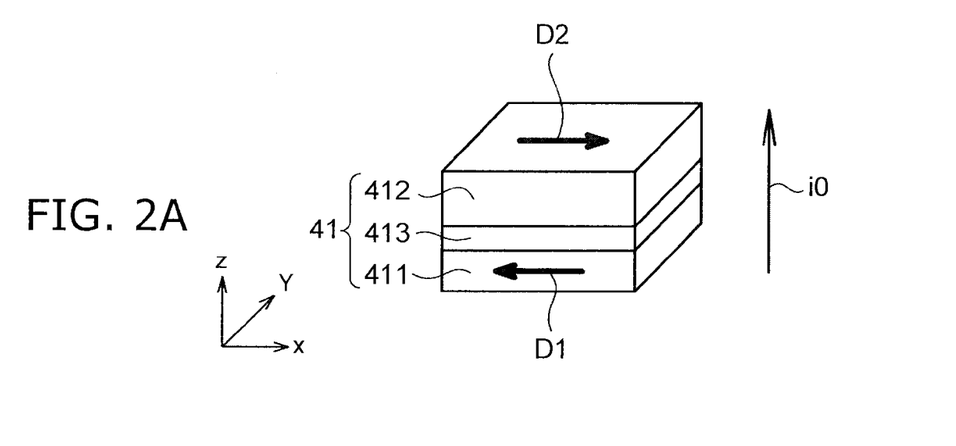
FIGS. 2A to 2C are schematic views illustrating a magnetoresistance effect element.
Figure 2B:
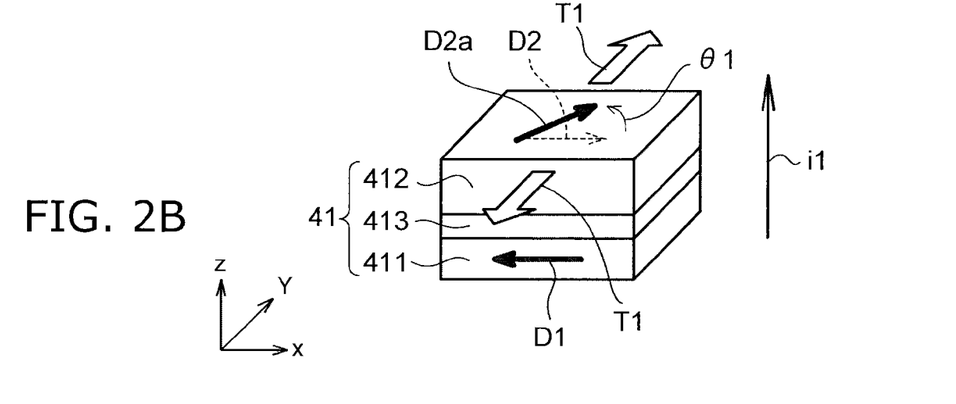
Figure 2C:
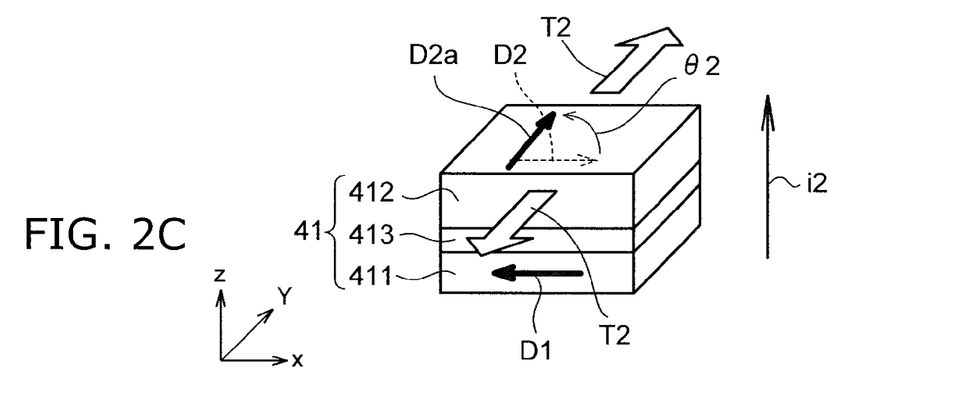

FIGS. 2A to 2C are schematic views illustrating a magnetoresistance effect element.

As shown in FIG. 1A, the strain sensor 110 includes a substrate 10, a lid 20, a frame 30, and a sensing unit 40.

The substrate 10 has a first surface 10a and a second surface 10b. The second surface 10b is the surface on the side opposite to the first surface 10a. In the embodiment, a direction orthogonal to the first surface 10a is taken as a Z-direction; one direction orthogonal to the Z-direction is taken as an X-direction; and a direction orthogonal to the Z-direction and the X-direction is taken as a Y-direction. In the Z-direction, the direction from the second surface 10b toward the first surface 10a is taken to be up (upward); and the opposite direction is taken to be down (downward).

The substrate 10 includes, for example, an insulating material (a glass epoxy, etc.). The thickness of the substrate 10 is, for example, 300 micrometers (μm). A first interconnect 11 is provided at the first surface 10a of the substrate 10. A second interconnect 12 is provided at the second surface 10b of the substrate 10. A via interconnect 13 is provided in the substrate 10. The via interconnect 13 is provided between the first surface 10a and the second surface 10b. The via interconnect 13 connects the first interconnect 11 to the second interconnect 12. As shown in FIG. 1B, the exterior form of the substrate 10 as viewed from the Z-direction is, for example, a rectangle.

The lid 20 is provided on the first surface 10a of the substrate 10. The lid 20 includes, for example, a resin. The lid 20 may include a metal. From the aspect of making the strain sensor 110 lighter, etc., it is desirable for the lid 20 to include a resin. A through-hole 20h may be provided in the lid 20.

The frame 30 is provided between the substrate 10 and the lid 20. The frame 30 is provided on the first surface 10a of the substrate 10 to be interposed between the substrate 10 and the lid 20. The frame 30 is provided, for example, around the outside of the sensing unit 40. In the embodiment, the interior of the frame 30 is the region (the space) around which the substrate 10, the lid 20, and the frame 30 are provided.

The frame 30 is nonconductive and includes a magnetic body 31. The frame 30 includes a resin portion 32 and the magnetic body 31. The resin portion 32 includes, for example, an epoxy resin. The magnetic body 31 is, for example, a magnetic powder. The magnetic body 31 is mixed inside the resin portion 32 which is the main material. The frame 30 is, for example, a magnetic paste that is cured.

An alloy (a Ni—Cu—Zn alloy) that includes nickel (Ni), copper (Cu), and zinc (Zn) is an example of the magnetic body 31. The configurations of the particles of the magnetic body 31 are, for example, spherical and irregular. The specific resistance of the magnetic body 31 is, for example, $10^6$ ohm meters (Ω·m).

In the case where a magnetic paste is used as the frame 30, the viscosity of the magnetic paste is, for example, not less than 100 Pa·s (pascal seconds) and not more than 400 Pa·s. The curing temperature of the magnetic paste is, for example, not more than 150 degrees (° C.). A glass transition point Tg of the magnetic paste is not less than 150° C. The elastic modulus of the magnetic paste is, for example, not less than 5 GPa (gigapascals) and not more than 30 GPa. A linear coefficient of thermal expansion al of the magnetic paste is, for example, not less than 5 ppm/° C. and not more than 30 ppm/° C.

The frame 30 may be provided on the first interconnect of the first surface 10a. Because the frame 30 is nonconductive, the frame 30 may be provided in contact with the first interconnect 11. As shown in FIG. 1B, the frame 30 may overlap the first interconnect 11 as viewed from the Z-direction. Thereby, the size of the entire strain sensor 110 can be smaller than in the case where the frame 30 is provided outside the first interconnect 11.

The sensing unit 40 is provided inside the frame 30 between the substrate 10 and the lid 20. The sensing unit 40 includes a magnetoresistance effect element 41. The sensing unit 40 includes, for example, a semiconductor substrate 40s. The semiconductor substrate 40s includes, for example, a silicon substrate or an SOI (Silicon On Insulator) substrate. The magnetoresistance effect element 41 is formed in the semiconductor substrate 40s. The magnetoresistance effect element 41 may be mounted on the semiconductor substrate 40s.

The sensing unit 40 is electrically and mechanically connected to the first interconnect 11 via a bump electrode 50. The thickness of the bump electrode 50 is, for example, 100 µm. A pad electrode (not shown) of the sensing unit 40 is electrically connected to the second interconnect 12 via the first interconnect 11 and the via interconnect 13. A resin 51 for reinforcing may be provided around the bump electrode 50. A space S1 that has substantially the same height as the bump electrode 50 is provided between the sensing unit 40 and the first surface 10a of the substrate 10.

The sensing unit 40 includes a fixed portion 45 and a movable portion 46. As shown in FIG. 1A, the fixed portion 45 is the thick portion of the sensing unit 40. The movable portion 46 is the thin portion (the portion that is thinner than the fixed portion 45) of the sensing unit 40. The movable portion 46 is, for example, a diaphragm. Other than a diaphragm, the movable portion 46 may be a movable beam.

As shown in FIG. 1B, the movable portion 46 is provided at the central portion of the sensing unit 40. The configuration of the movable portion 46 as viewed from the Z-direction is, for example, a circle. The movable portion 46 is, for example, the portion made by reducing the thickness of the central portion of the semiconductor substrate 40s by etching. The thickness of the movable portion 46 is, for example, not less than 50 nanometers (nm) and not more than 1 µm, and more desirably not less than 100 nm and not more than 500 nm. The portion of the semiconductor substrate 40s that is not made to be thin is the fixed portion 45. The bump electrode 50 is connected to the fixed portion 45 of the sensing unit 40.

A support unit 60 may be provided between the lid 20 and the sensing unit 40. The support unit 60 is provided between the lid 20 and the fixed portion 45 of the sensing unit 40. The spacing between the lid 20 and the sensing unit 40 is stabilized by the height of the support unit 60.

The space S1 is provided between the movable portion 46 and the first surface 10a of the substrate 10. A space S2 is provided between the movable portion 46 and the lid 20. The movable portion 46 is movable vertically to deflect between the space S1 and the space S2.

The magnetoresistance effect element 41 is provided at the movable portion 46. As shown in FIGS. 2A to 2C, the magnetoresistance effect element 41 includes a fixed layer 411 and a free layer 412. An intermediate layer 413 is provided between the fixed layer 411 and the free layer 412.

The fixed layer 411 is a layer in which the orientation of magnetization is fixed. The orientation of magnetization is fixed in a direction (for example, the X-direction) along the first surface 10a of the substrate 10. The fixed layer 411 is a magnetic layer. The free layer 412 is a layer in which the orientation of magnetization is not fixed. The free layer 412 is a magnetic layer. The intermediate layer 413 that is interposed between the fixed layer 411 and the free layer 412 is a nonmagnetic layer.

In the magnetoresistance effect element 41, a MR effect arises due to the inverse magnetostrictive effect according to the stress applied to the magnetoresistance effect element 41. The MR effect is a phenomenon in which the value of the electrical resistance of the stacked film changes due to the change of the magnetization of the magnetic body. In the magnetoresistance effect element 41, the amount of the current flowing between the fixed layer 411 and the free layer 412 changes due to the change of the orientation of magnetization of the free layer 412.

In the strain sensor 110, the frame 30 has the effect of a magnetic shield that blocks external magnetic fields. In the strain sensor 110, the external magnetic fields are blocked by the frame 30 without using a metal case. Accordingly, the strain sensor 110 is lighter than in the case where a metal case is used.

The change of the value of the electrical resistance of the magnetoresistance effect element 41 will now be described with reference to FIGS. 2A to 2C.

FIG. 2A shows the state in which stress is not applied to the magnetoresistance effect element 41. In the example, an orientation of magnetization D2 of the free layer 412 differs from an orientation of magnetization D1 of the fixed layer 411 by 180 degrees. In such a case, a current i0 flows from the fixed layer 411 toward the free layer 412 in the magnetoresistance effect element 41.

FIG. 2B shows the state in which a tensile stress T1 is applied to the magnetoresistance effect element 41. When the stress T1 is applied to the magnetoresistance effect element 41, the orientation of magnetization D2 of the free layer 412 changes to an orientation D2a. The orientation of magnetization D2a differs from the orientation of magnetization D1 of the fixed layer 411 by 180-θ1 degrees. In such a case, a current i1 flows from the fixed layer 411 toward the free layer 412 in the magnetoresistance effect element 41. The amount of the current i1 is greater than the amount of the current i0. In other words, the value of the electrical resistance of the magnetoresistance effect element 41 decreases.

FIG. 2C shows the state in which a tensile stress T2 is applied to the magnetoresistance effect element 41. The stress T2 is greater than the stress T1. When the stress T2 is applied to the magnetoresistance effect element 41, the orientation of magnetization D2 of the free layer 412 changes to an orientation D2b. The orientation of magnetization D2b differs from the orientation of magnetization D1 of the fixed layer 411 by 180-θ2 degrees. θ2 is greater than θ1. In such a case, a current i2 flows from the fixed layer 411 toward the free layer 412 in the magnetoresistance effect element 41. The amount of the current i2 is greater than the amount of the current i0 and the amount of the current i1. In other words, the value of the electrical resistance of the magnetoresistance effect element 41 decreases further.

Thus, the value of the electrical resistance of the magnetoresistance effect element 41 changes according to the applied stress. FIGS. 2A to 2C show the states from the state in which stress is not applied to the magnetoresistance effect element 41, to the states in which the tensile stress T1 and T2 are applied to the magnetoresistance effect element 41. The direction of the change of the orientation of magnetization of the free layer 412 for the case where a tensile stress is applied to the magnetoresistance effect element 41 is the opposite of the case where a compressive stress is applied to the magnetoresistance effect element 41.

A bias magnetic field may be applied to the magnetoresistance effect element 41 as necessary. By applying the bias magnetic field, the orientation of magnetization D2 of the free layer 412 is specified in the state in which stress is not applied to the magnetoresistance effect element 41. For example, in the case where it is desirable to increase or reduce the value of the electrical resistance of the magnetoresistance effect element 41 from compressive stress to tensile stress, the orientation of magnetization D2 of the free layer 412 (the orientation of magnetization when stress is not applied) is specified by the bias magnetic field to be at the central vicinity of the variation range of the value of the electrical resistance of the magnetoresistance effect element 41.

FIGS. 3A to 3D are schematic views illustrating the change of the orientation of magnetization according to the stress.

Figure 3A:
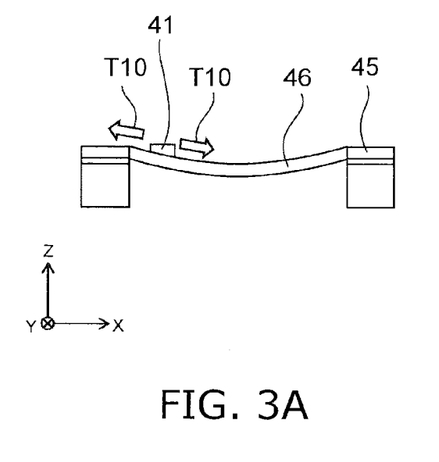
FIGS. 3A to 3D are schematic views illustrating the change of the orientation of magnetization according to the stress.
Figure 3B:
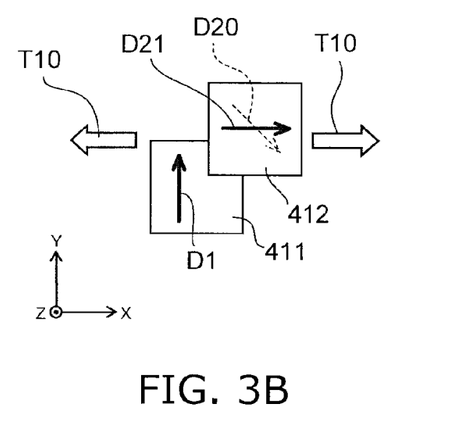

FIGS. 3A and 3B show the state in which a tensile stress T10 is applied to the magnetoresistance effect element 41. FIG. 3A is a schematic cross-sectional view of the sensing unit 40 as viewed from the Y-direction. FIG. 3B is a schematic plan view of the magnetoresistance effect element 41 as viewed from the Z-direction. FIG. 3B shows the position of the free layer 412 as being shifted from the fixed layer 411 for convenience of description.

Figure 3C:
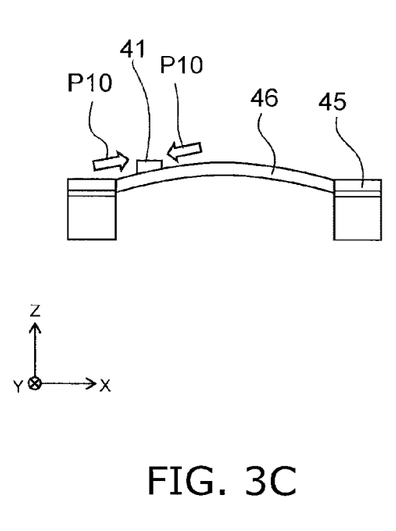
Figure 3D:
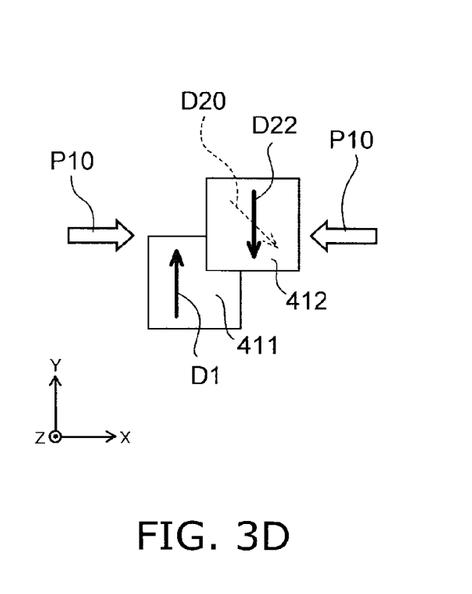

FIGS. 3C and 3D show the state in which a compressive stress P10 is applied to the magnetoresistance effect element 41. FIG. 3C is a schematic cross-sectional view of the sensing unit 40 as viewed from the Y-direction. FIG. 3D is a schematic plan view of the magnetoresistance effect element 41 as viewed from the Z-direction. FIG. 3D shows the position of the free layer 412 as being shifted from the fixed layer 411 for convenience of description.

As shown in FIGS. 3A and 3C, the magnetoresistance effect element 41 is provided at the movable portion 46 of the sensing unit 40. The direction (tension or compression) of the stress applied to the magnetoresistance effect element 41 changes according to the direction of the warp of the movable portion 46.

For example, when the central portion of the movable portion 46 is warped to become a downward protrusion as shown in FIG. 3A, the tensile stress T10 is applied to the magnetoresistance effect element 41. When the tensile stress T10 is applied to the magnetoresistance effect element 41 as shown in FIG. 3B, the orientation of magnetization of the free layer 412 is an orientation D21. In the state in which stress is not applied to the magnetoresistance effect element 41, the orientation of magnetization of the free layer 412 is an orientation D20. The orientation of magnetization D20 is rotated from the orientation of magnetization D1 of the fixed layer 411 along, for example, the XY plane by, for example, 135 degrees.

When the tensile stress T10 is applied to the magnetoresistance effect element 41 in this state, the orientation of magnetization of the free layer 412 changes from the orientation D20 to the orientation D21. The orientation of magnetization D21 is rotated from the orientation of magnetization D1 of the fixed layer 411 along, for example, the XY plane by 90 degrees. In other words, the orientation of magnetization of the free layer 412 rotates toward the orientation of magnetization D1 of the fixed layer 411 due to the application of the tensile stress T10.

Thereby, the value of the electrical resistance of the magnetoresistance effect element 41 prior to the application of the tensile stress T10 decreases as the tensile stress T10 is applied. Accordingly, the current flowing from the fixed layer 411 toward the free layer 412 in the magnetoresistance effect element 41 prior to the application of the tensile stress T10 increases as the tensile stress T10 is applied.

For example, when the central portion of the movable portion 46 is warped to become an upward protrusion as shown in FIG. 3C, the compressive stress P10 is applied to the magnetoresistance effect element 41. When the compressive stress P10 is applied to the magnetoresistance effect element 41 as shown in FIG. 3D, the orientation of magnetization of the free layer 412 changes from the orientation D20 to an orientation D22.

The orientation of magnetization D22 is rotated from the orientation of magnetization D1 of the fixed layer 411 along, for example, the XY plane by 180 degrees. In other words, the orientation of magnetization of the free layer 412 rotates away from the orientation of magnetization D1 of the fixed layer 411 due to the application of the compressive stress P10.

Thereby, the value of the electrical resistance of the magnetoresistance effect element 41 prior to the application of the compressive stress P10 increases as the compressive stress P10 is applied. Accordingly, the current flowing from the fixed layer 411 toward the free layer 412 in the magnetoresistance effect element 41 prior to the application of the compressive stress P10 decreases as the compressive stress P10 is applied.

Figure 4:
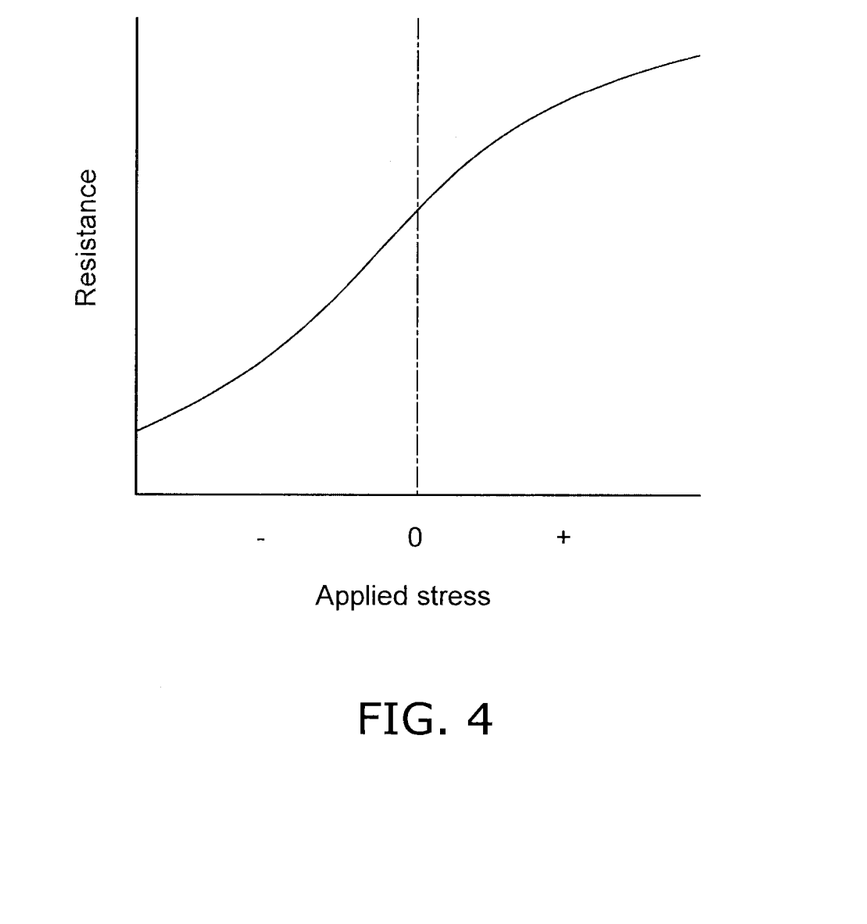
FIG. 4 shows the relationship between the stress and the value of the electrical resistance.

FIG. 4 illustrates the relationship between the stress and the value of the electrical resistance.

The horizontal axis of FIG. 4 is the stress applied to the magnetoresistance effect element 41. For the horizontal axis of FIG. 4, "0" is the state in which stress is not applied; "−" is tensile stress; and "+" is compressive stress. The vertical axis of FIG. 4 is the value of the electrical resistance of the magnetoresistance effect element 41.

As shown in FIG. 4, the value of the electrical resistance of the magnetoresistance effect element 41 decreases as the tensile stress applied to the magnetoresistance effect element 41 increases. On the other hand, the value of the electrical resistance of the magnetoresistance effect element 41 increases as the compressive stress applied to the magnetoresistance effect element 41 increases. The value of the electrical resistance of the magnetoresistance effect element 41 in the state in which stress is not applied is appropriately set by the bias magnetic field applied to the free layer 412. In the embodiment, the value of the electrical resistance of the magnetoresistance effect element 41 increases in one direction from the tensile stress to the compressive stress applied to the magnetoresistance effect element 41.

In the strain sensor 110, a magnetoresistance effect element 41 having such a characteristic is provided at the movable portion 46 of the sensing unit 40. Accordingly, the value of the electrical resistance of the magnetoresistance effect element 41 changes according to the stress applied to the magnetoresistance effect element 41 by vibrations of the movable portion 46. The value of the current flowing through the magnetoresistance effect element 41 changes due to the change of the value of the electrical resistance. Accordingly, the strain is sensed by the change of the current flowing through the magnetoresistance effect element 41.

The magnetoresistance effect element 41 is easily affected by an external magnetic field. In the strain sensor 110, the magnetic body 31 is included in the frame 30. Accordingly, the effect of the external magnetic field on the magnetoresistance effect element 41 is suppressed by providing the sensing unit 40 (the magnetoresistance effect element 41) inside the frame 30.

In the embodiment, the direction of magnetization of the free layer 412 of the magnetoresistance effect element 41 changes along the first surface 10a (the XY plane). In such a case, it is sufficient to provide a magnetic shield around at least the sides of the sensing unit 40. In the strain sensor 110, the effect of the external magnetic field on the magnetoresistance effect element 41 is suppressed sufficiently by a magnetic shield effect being provided by the frame 30 that is provided around the sides of the sensing unit 40.

The frame 30 is nonconductive. Therefore, the frame 30 may be provided in contact with the first interconnect 11. Here, in the case where a conductive frame is used, it is necessary for the frame to be provided in a region outside the first interconnect 11 at a position that is separated from the first interconnect 11. As in the embodiment, the frame 30 can be provided on the first interconnect 11 by the frame 30 being nonconductive. Accordingly, the size of the entire strain sensor 110 is reduced.

In the strain sensor 110, it is unnecessary to cover the periphery of the sensing unit 40 with a metal case because the magnetic shield effect is provided by the resin frame 30. Thereby, the strain sensor 110 can be lighter than in the case where a metal case is used. Also, by being lighter, a strain sensor 110 that has excellent drop impact resistance is provided.

Second Embodiment

A method for manufacturing a strain sensor according to a second embodiment will now be described.

FIG. 5A to FIG. 7B are schematic cross-sectional views illustrating the method for manufacturing the strain sensor.

Figure 5A:
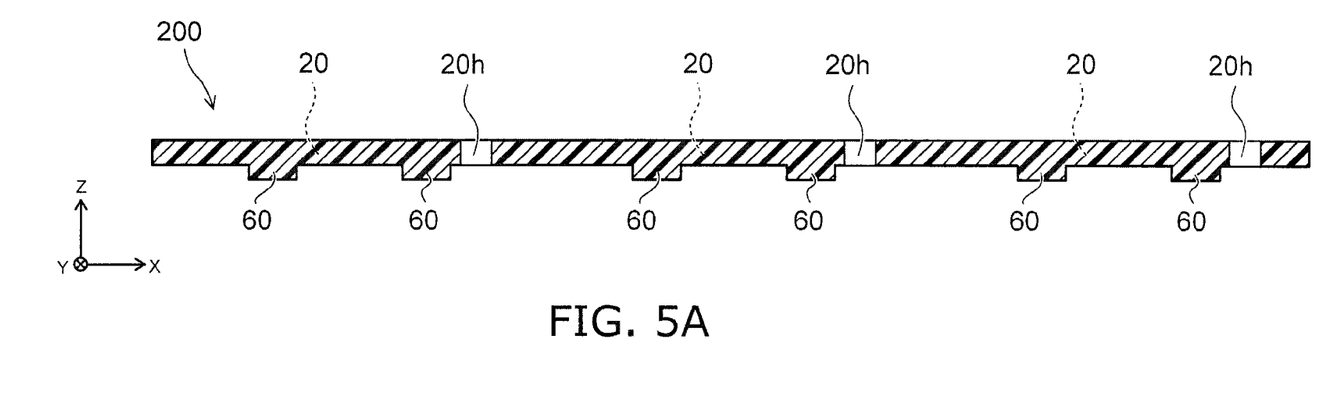

First, as shown in FIG. 5A, a lid material 200 is prepared. In the embodiment, the multiple lids 20 are formed from one lid material 200. The through-holes 20h and the support units 60 are provided in the lid material 200 to correspond to the positions of each of the lids 20. The lid material 200 includes, for example, a resin. The lid material 200 may include a metal. The embodiment is an example in which a resin is used as the lid material 200.

Figure 5B:
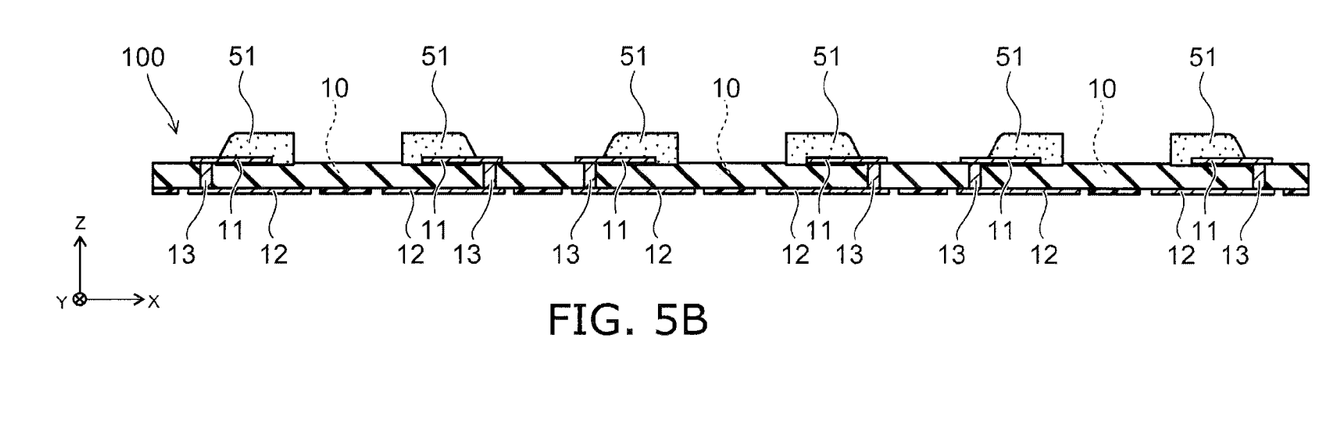

Then, a substrate material 100 is prepared as shown in FIG. 5B. In the embodiment, the multiple substrates 10 are formed from one substrate material 100. The first interconnects 11, the second interconnects 12, and the via interconnects 13 are formed in the substrate material 100 to correspond to the positions of each of the substrates 10. The substrate material 100 includes, for example, an insulating material (a glass epoxy, etc.).

Then, the resin 51 is coated in a paste form to correspond to the positions of each of the substrates 10 of the substrate material 100. The resin 51 is provided on the first interconnects 11.

Figure 6A:
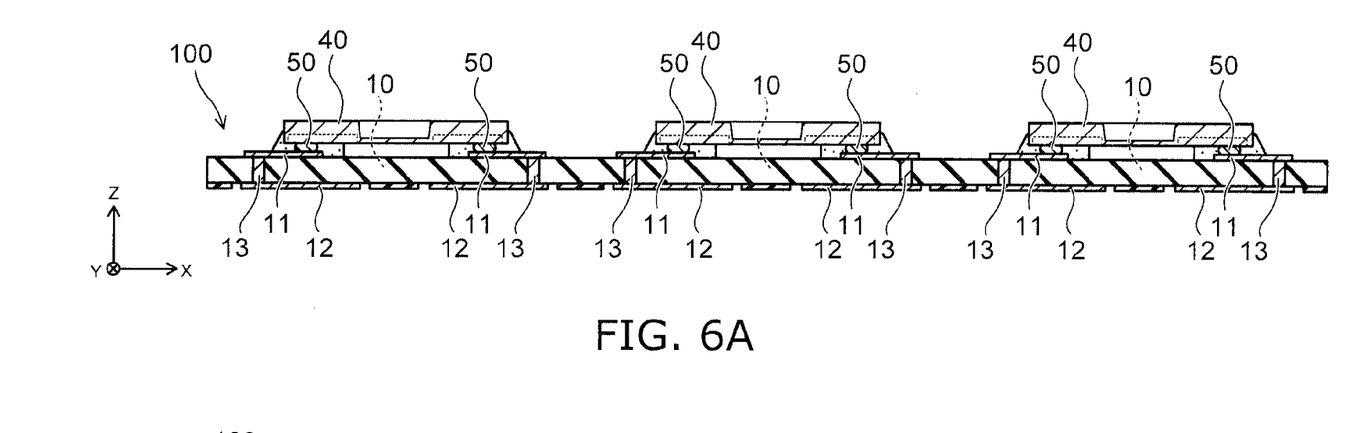

Continuing as shown in FIG. 6A, the sensing units 40 are mounted on the substrate material 100. The sensing units 40 are mounted to correspond to the positions of each of the substrates 10 of the substrate material 100. The sensing units 40 are electrically and mechanically connected to the first interconnects 11 via the bump electrodes 50. The bump electrodes 50 are buried in the resin 51 that was previously coated. The resin 51 is interposed between the sensing units 40 and the substrate material 100 to perform the role of reinforcing the bond between the bump electrodes 50 and the first interconnects 11.

Figure 6B:
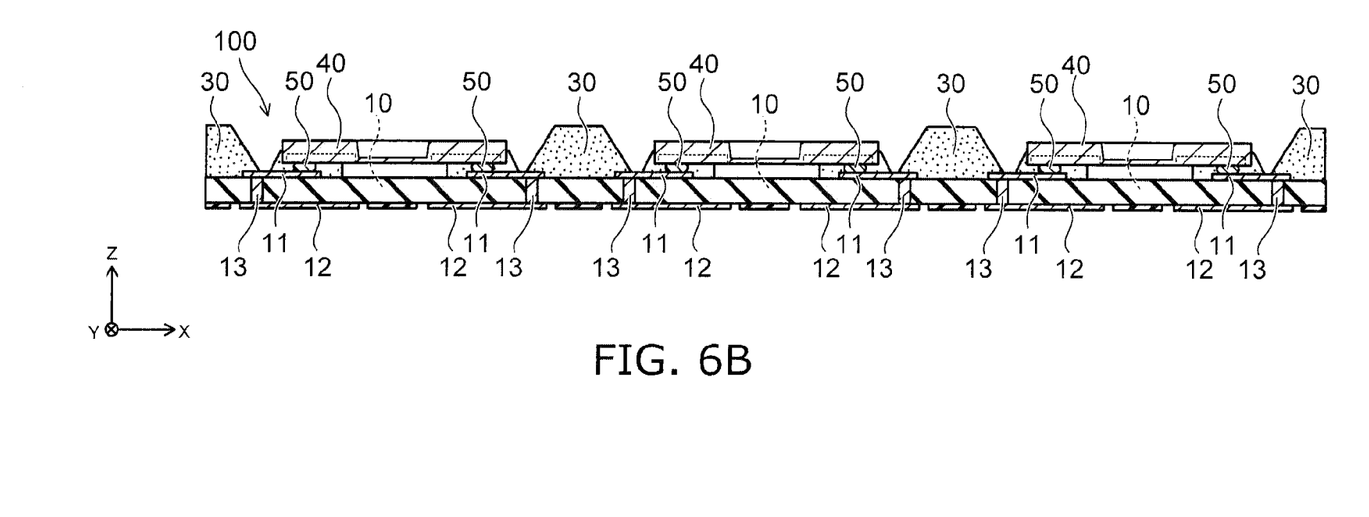

Then, as shown in FIG. 6B, the frames 30 are provided at the peripheries of the sensing units 40. The height of the frame 30 from the first surface 10a is higher than the height of the sensing unit 40 from the first surface 10a. The frames 30 may be provided on the first interconnects 11. The frames 30 include a magnetic paste. In the magnetic paste, the magnetic body 31 is mixed inside the resin portion 32 which is the main material. The magnetic paste is coated by, for example, printing.

Figure 7A:
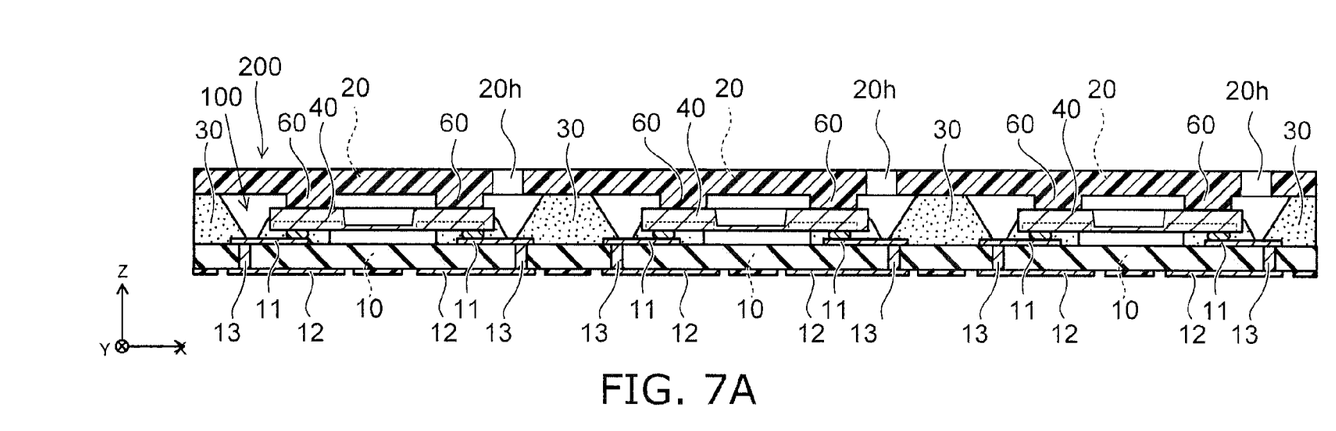

Continuing as shown in FIG. 7A, the lid material 200 is mounted on the frames 30. The frames 30 are in an uncured state when mounting the lid material 200 on the frames 30. When the lid material 200 is mounted on the uncured frames 30, the frames 30 are mashed by being pressed by the lid material 200. The lid material 200 approaches the sensing units 40 while pressing and mashing the frames 30. Then, the position of the lid material 200 is fixed when the support units 60 that are provided under the lid material 200 come into contact with the sensing units 40.

After the lid material 200 is mounted, the frames 30 and the resin 51 are cured. For example, the frames 30 and the resin 51 are cured by heating to a prescribed temperature.

Figure 7B:
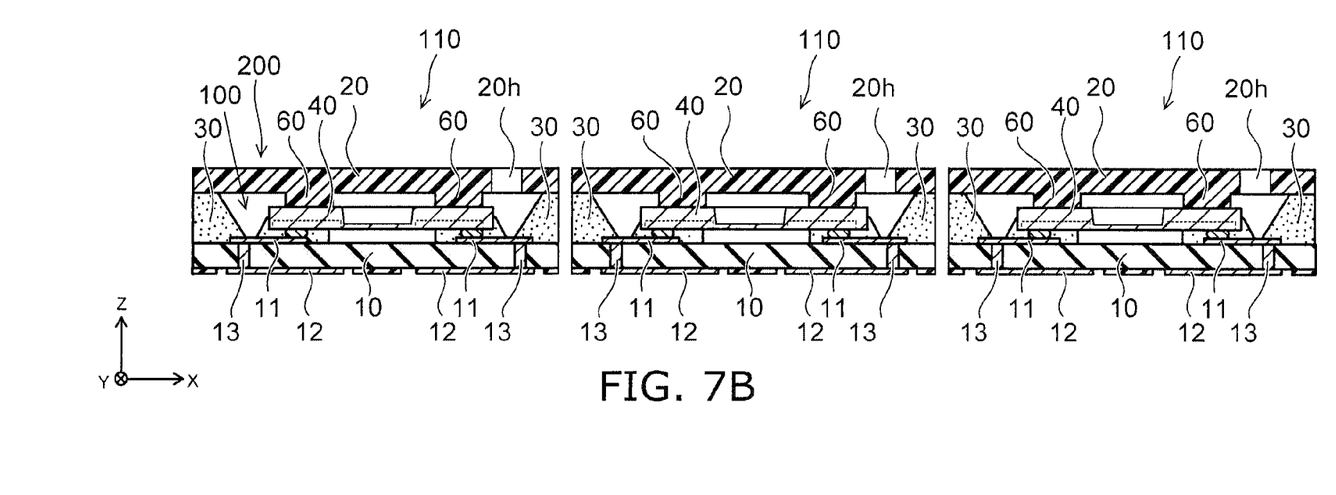

Then, as shown in FIG. 7B, the lid material 200, the frames 30, and the substrate material 100 are cut. The lid material 200, the frames 30, and the substrate material 100 are cut in the Z-direction at the positions of substantially the centers of the frames 30. The subdivided lid material 200 is used as the lids 20. The subdivided substrate material 100 is used as the substrates 10. Thereby, the multiple strain sensors 110 are completed. In the strain sensor 110 thus manufactured, the side surface of the lid 20 is provided in the same plane as the side surface of the frame 30 and the side surface of the substrate 10.

In such a manufacturing method, multiple strain sensors 110 are formed collectively by cutting the substrate material 100, the lid material 200, and the frames 30. In the manufacturing method, the multiple strain sensors 110 are manufactured with higher productivity than in the case where the sensing units are covered from above with individual metal cases.

Third Embodiment

A strain sensor according to a third embodiment will now be described.

Figure 8:
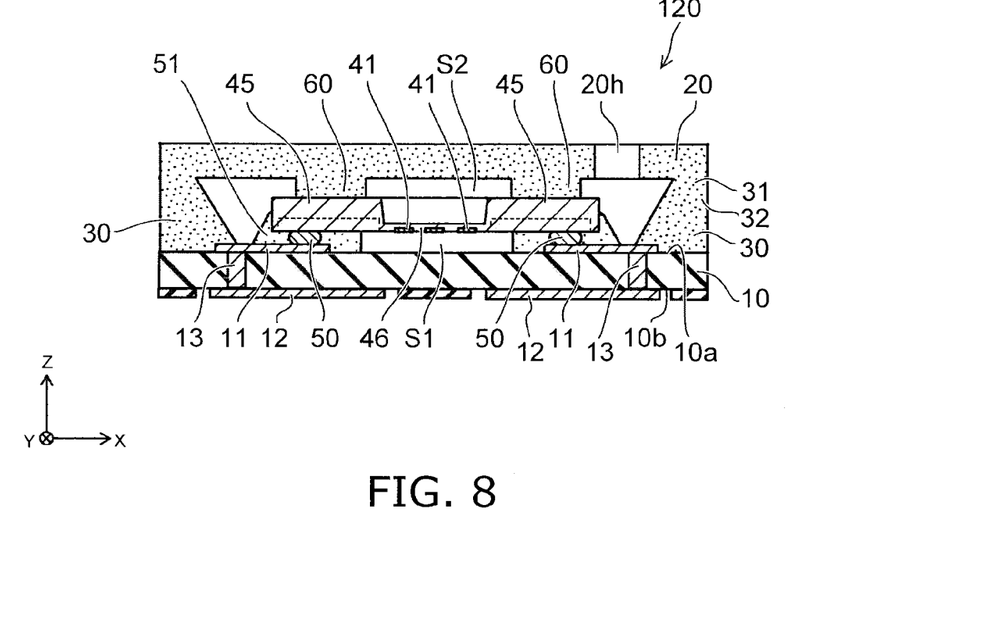
FIG. 8 is a schematic cross-sectional view illustrating the strain sensor according to the third embodiment.

FIG. 8 is a schematic cross-sectional view illustrating the strain sensor according to the third embodiment.

In the strain sensor 120 according to the third embodiment as shown in FIG. 8, the frame 30 is provided as one body with the lid 20. In the example shown in FIG. 8, the support unit 60 also is provided as one body with the lid 20.

In the strain sensor 120, the lid 20 and the frame 30 are nonconductive and include the magnetic body 31. For example, the lid 20 and the frame 30 of the strain sensor 120 are formed of the same material as the frame 30 of the strain sensor 110.

The lid 20 and the frame 30 include the resin portion 32 and the magnetic body 31. The lid 20 and the frame 30 are, for example, cured. In the strain sensor 120, the support unit 60 also may be formed of the same material as the lid 20 and the frame 30.

In the strain sensor 120, a magnetic shield effect is provided by the frame 30; and a magnetic shield effect is provided by the lid 20. In other words, in the strain sensor 120, a magnetic shield sideward of the magnetoresistance effect element 41 is provided by the frame 30. Also, in the strain sensor 120, a magnetic shield above the magnetoresistance effect element 41 is provided by the lid 20. In the strain sensor 120, the external magnetic fields toward the magnetoresistance effect element 41 from the side and from above are blocked effectively.

In such a strain sensor 120, the shielding effect from the external magnetic fields from the side and from above is increased because both the frame 30 and the lid 20 include the resin including the magnetic body 31. Further, the strain sensor 120 is lighter than in the case where a metal case is used. Also, by being lighter, a strain sensor 120 having excellent drop impact resistance is provided.

Fourth Embodiment

A method for manufacturing a strain sensor according to a fourth embodiment will now be described.

FIG. 9A to FIG. 10B are schematic cross-sectional views illustrating the method for manufacturing the strain sensor.

Figure 9A:
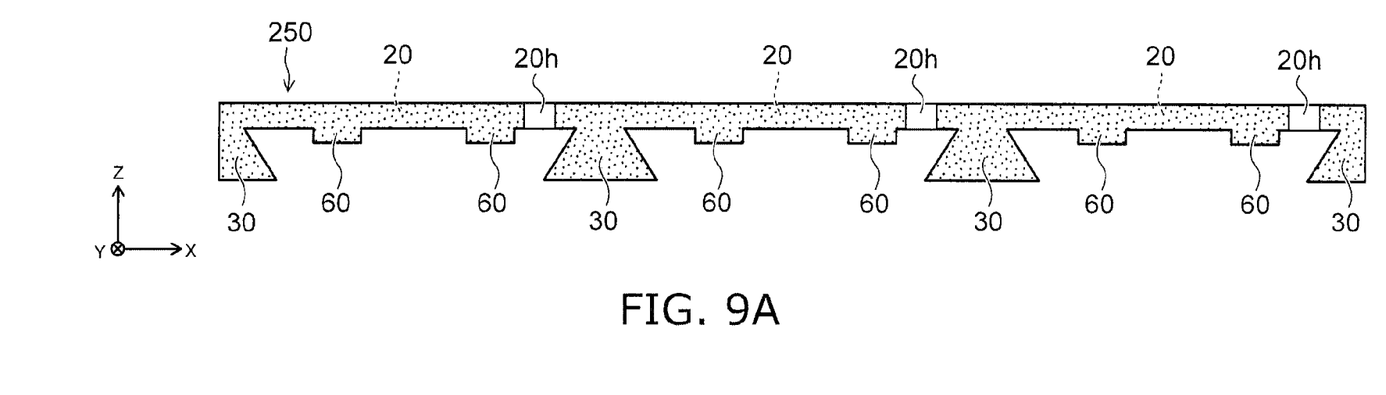

First, a lid material 250 is prepared as shown in FIG. 9A. In the embodiment, the multiple lids 20 are formed from one lid material 250. The frames 30, the through-holes 20h, and the support units 60 are provided in the lid material 250 to correspond to the positions of each of the lids 20. In other words, the frames 30 and the support units 60 are formed as one body with the lid material 250. The lid material 250 includes a resin including the magnetic body 31. The lid material 250 is formed by curing a magnetic paste.

Figure 9B:
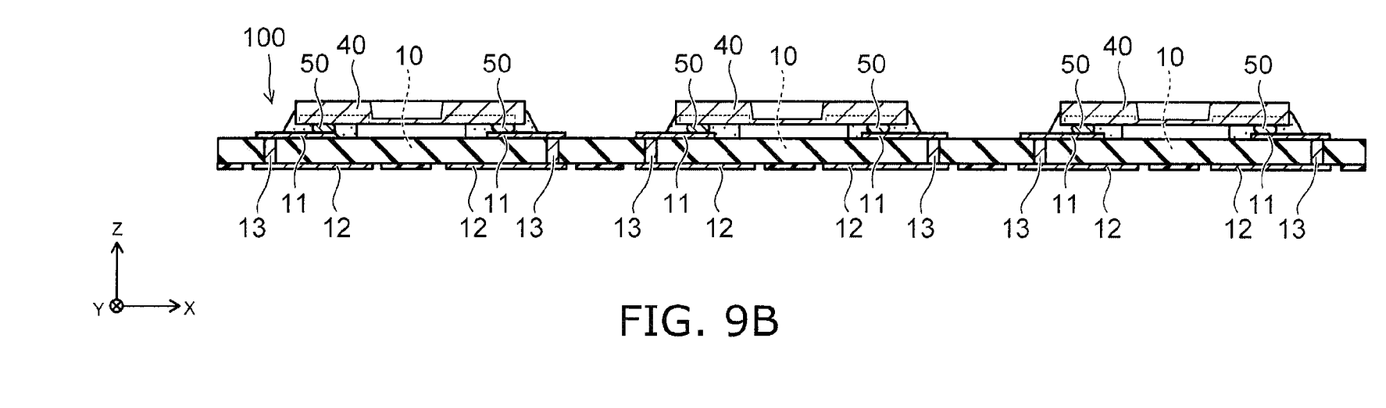

Then, the substrate material 100 is prepared as shown in FIG. 9B. In the embodiment, the multiple substrates 10 are formed from one substrate material 100. The first interconnects 11, the second interconnects 12, and the via interconnects 13 are formed in the substrate material 100 to correspond to the positions of each of the substrates 10. The substrate material 100 includes, for example, an insulating material (a glass epoxy, etc.).

Continuing, the resin 51 is coated in a paste form to correspond to the positions of each of the substrates 10 of the substrate material 100. The resin 51 is provided on the first interconnects 11.

Then, the sensing units 40 are mounted on the substrate material 100. The sensing units 40 are mounted to correspond to the positions of each of the substrates 10 of the substrate material 100. The sensing units 40 are electrically and mechanically connected to the first interconnects 11 via the bump electrodes 50. The bump electrodes 50 are buried in the resin 51 that was previously coated. The resin 51 is interposed between the sensing units 40 and the substrate material 100 to perform the role of reinforcing the bond between the bump electrodes 50 and the first interconnects 11.

Figure 10A:
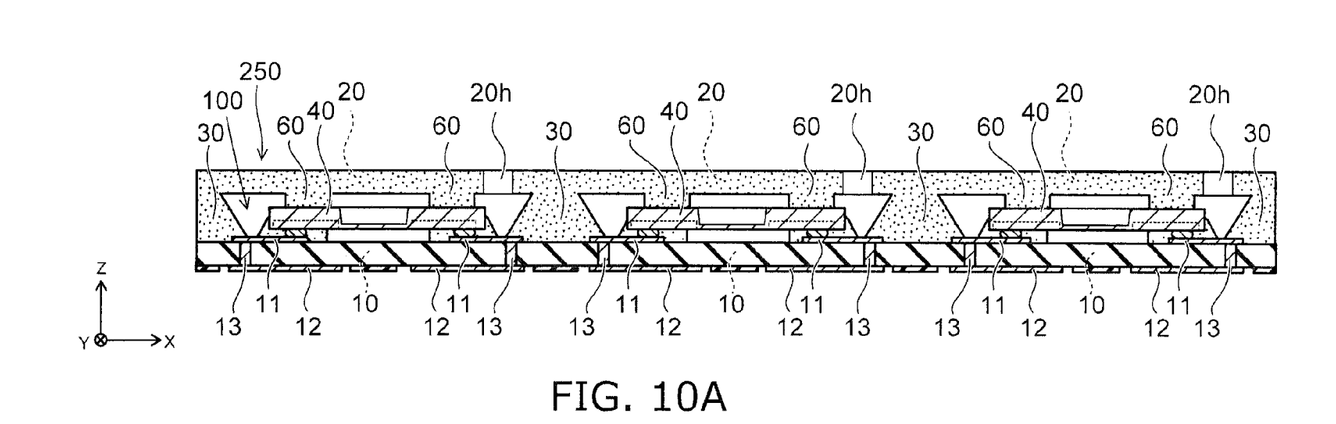

Continuing as shown in FIG. 10A, the lid material 250 is mounted on the substrate material 100. When mounting the lid material 200 on the substrate material 100, an uncured magnetic paste is coated between the frames 30 and the substrate material 100. The position of the lid material 250 is fixed when the support units 60 that are provided under the lid material 250 come into contact with the sensing unit 40.

After the lid material 250 is mounted, the resin 51 and the magnetic paste that is coated between the frames 30 and the substrate material 100 are cured. For example, the magnetic paste and the resin 51 are cured by heating to a prescribed temperature.

Figure 10B:
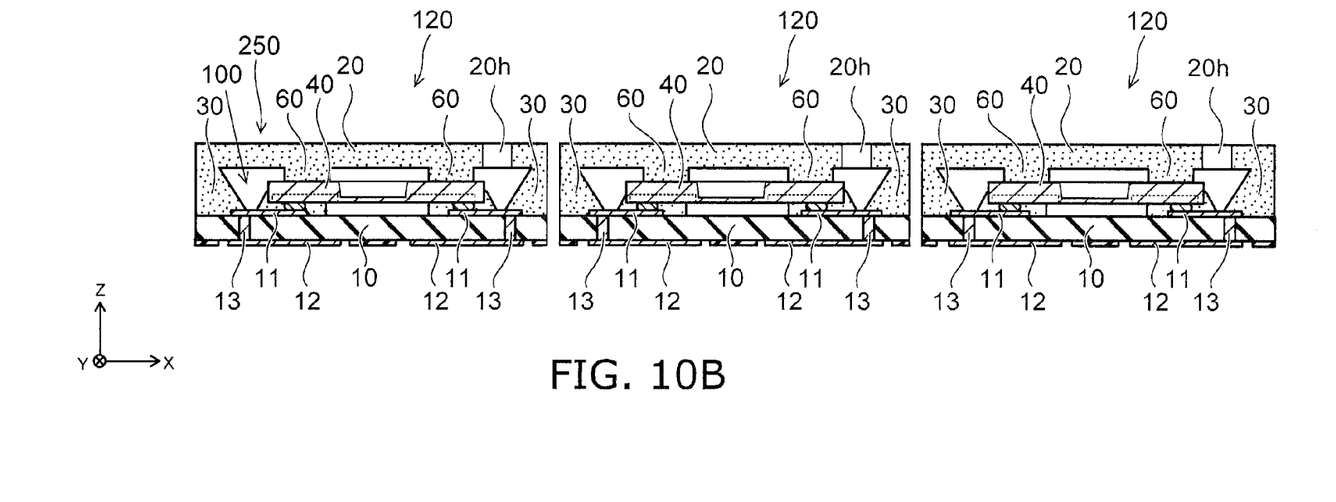

Then, as shown in FIG. 10B, the lid material 250, the frames 30, and the substrate material 100 are cut. The lid material 250, the frames 30, and the substrate material 100 are cut in the Z-direction at the positions of substantially the centers of the frames 30. The subdivided lid material 250 is used as the lid 20. The subdivided substrate material 100 is used as the substrate 10. Thereby, the multiple strain sensors 120 are completed. In the strain sensor 120 thus manufactured, the side surface of the lid 20 is provided in the same plane as the side surface of the frame 30 and the side surface of the substrate 10.

In such a manufacturing method, multiple strain sensors 120 are formed collectively by cutting the substrate material 100, the lid material 250, and the frames 30. In the manufacturing method, the multiple strain sensors 120 are manufactured with higher productivity than in the case where the sensing units are covered from above with individual metal cases.

The strain sensors 110 and 120 described above are included in, for example, the sensing portions of microphones. In the case where the strain sensors 110 and 120 are used as the sensing portions of microphones, the through-hole 20h is a sound hole.

Figure 11:
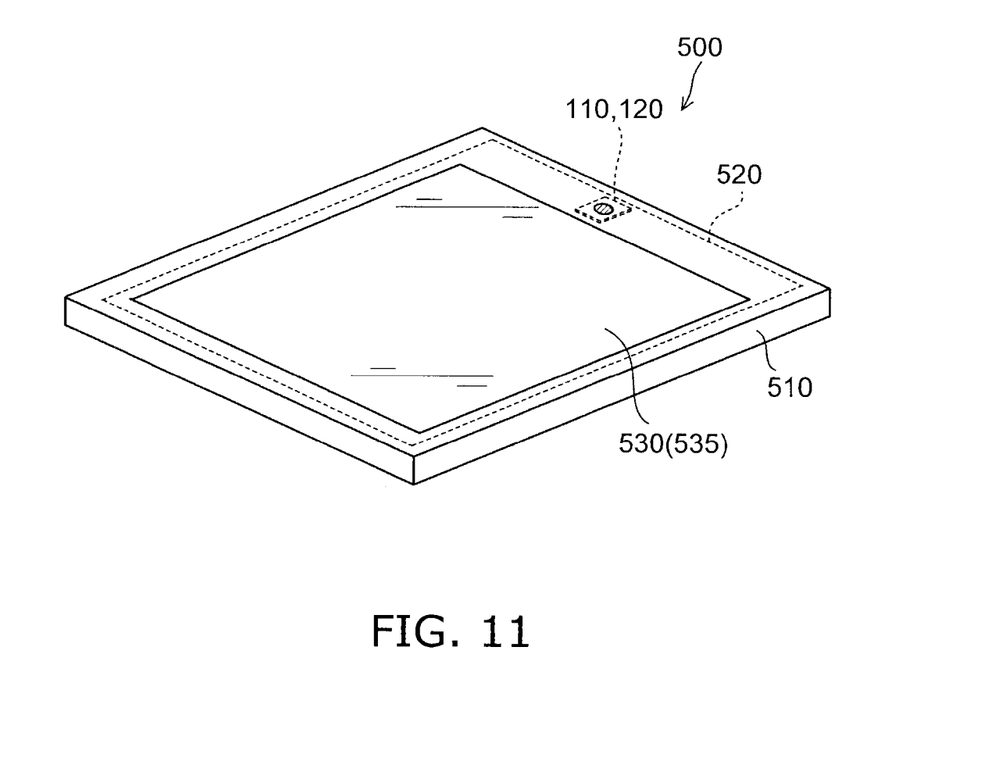
FIG. 11 is a schematic perspective view illustrating an electronic device.

FIG. 11 is a schematic perspective view illustrating an electronic device.

As shown in FIG. 11, the strain sensors 110 and 120 are used in various electronic devices 500. The electronic device 500 includes a housing 510, and a printed wiring board 520 that is provided inside the housing 510. The electronic device 500 may include a display unit 530. An input unit 535 such as a touch panel, etc., may be provided in the display unit 530. The strain sensors 110 and 120 are mounted on, for example, the printed wiring board 520.

A mobile telephone, a portable terminal, a personal computer, a voice recorder, a video camcorder, a digital camera, a television, etc., are examples of the electronic device 500. The electronic device 500 can be small and light by the strain sensors 110 and 120 being applied to the electronic device 500.

As described above, according to the strain sensor and the method for manufacturing the strain sensor according to the embodiments, a product having excellent magnetic shield characteristics can be provided with high productivity.

Although the embodiments are described above, the invention is not limited to these examples. For example, additions, deletions, or design modifications of components or appropriate combinations of the features of the embodiments appropriately made by one skilled in the art in regard to the embodiments or the modifications thereof described above are within the scope of the invention to the extent that the purport of the invention is included.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. A strain sensor, comprising:
a substrate having a first surface;
a lid provided on the first surface;
a frame provided between the substrate and the lid, the frame being nonconductive and including a magnetic body; and
a sensing unit provided inside the frame between the substrate and the lid, the sensing unit including a magnetoresistance effect element.

2. The sensor according to claim 1, wherein the sensing unit includes:
a fixed portion; and
a movable portion, the magnetoresistance effect element being provided at the movable portion.

3. The sensor according to claim 1, wherein the sensing unit includes a semiconductor substrate, and the magnetoresistance effect element mounted on the semiconductor substrate.

4. The sensor according to claim 1, wherein the magnetoresistance effect element includes:
a fixed layer, an orientation of magnetization of the fixed layer being fixed in a direction along the first surface; and
a free layer, an orientation of magnetization of the free layer not being fixed.

5. The sensor according to claim 1, further comprising a support unit provided between the lid and the sensing unit to contact the lid and the sensing unit.

6. The sensor according to claim 1, wherein the frame is provided around the sensing unit.

7. The sensor according to claim 1, wherein the frame includes a resin portion including the magnetic body.

8. The sensor according to claim 1, wherein the frame includes a magnetic paste having a viscosity not less than 100 Pa·s (pascal seconds) and not more than 400 Pa·s, a curing temperature of 150 degrees (° C.) or less, a glass transition point of 150° C. or more, an elastic modulus not less than 5 GPa (gigapascals) and not more than 30 GPa, and a linear coefficient of thermal expansion not less than 5 ppm/° C. and not more than 30 ppm/° C.

9. The sensor according to claim 1, wherein the lid includes a resin.

10. The sensor according to claim 1, wherein the substrate includes a glass epoxy.

11. The sensor according to claim 1, wherein a side surface of the lid is provided in a same plane of a side surface of the frame and a side surface of the substrate.

12. The sensor according to claim 1, further comprising:
a first interconnect provided along the first surface; and
a bump electrode provided between the sensing unit and the first interconnect.

13. The sensor according to claim 2, wherein the sensing unit is a diaphragm including the fixed portion and the movable portion, the movable portion being provided to be thinner than the fixed portion.

14. The sensor according to claim 2, wherein the movable portion is a movable beam.

15. The sensor according to claim 4, wherein a bias magnetic field is applied to the magnetoresistance effect element.

16. The sensor according to claim 7, wherein
the resin portion includes an epoxy resin, and
the magnetic body is an alloy including nickel, copper, and zinc (Zn).

17. The sensor according to claim 9, wherein the lid is nonconductive and further includes the magnetic body.

18. A method for manufacturing a strain sensor, comprising:
preparing a substrate material having a first surface;
preparing a sensing unit including a magnetoresistance effect element;
mounting the sensing unit on the first surface;
coating a paste material onto the first surface around a periphery of the sensing unit, the paste material being nonconductive and including a magnetic body;
mounting a lid material on the sensing unit with the paste material interposed;
forming a frame by curing the paste material; and
cutting the lid material, the frame, and the substrate material in a direction orthogonal to the first surface.

19. The method according to claim 18, wherein the mounting of the lid material includes mounting the lid material with a support unit interposed between the lid material and the sensing unit.

20. The method according to claim 19, wherein
the preparing of the sensing unit includes preparing a plurality of the sensing units, and
the coating of the paste material includes coating the paste material around peripheries of each of the plurality of sensing units.

\* \* \* \* \*